(12) United States Patent
Kusic

(10) Patent No.: US 7,306,186 B2
(45) Date of Patent: *Dec. 11, 2007

(54) TANDEM POWERED POWER TILTING AIRCRAFT

(76) Inventor: Tom Kusic, PO Box 932, Melbourne VIC 3001 (AU)

( * ) Notice: Subject to any disclaimer, the term of this patent is extended or adjusted under 35 U.S.C. 154(b) by 382 days.

This patent is subject to a terminal disclaimer.

(21) Appl. No.: 10/518,477

(22) PCT Filed: Jun. 27, 2003

(86) PCT No.: PCT/AU03/00816

§ 371 (c)(1),
(2), (4) Date: Dec. 20, 2004

(87) PCT Pub. No.: WO2004/002824

PCT Pub. Date: Jan. 8, 2004

(65) Prior Publication Data

US 2005/0230520 A1    Oct. 20, 2005

(30) Foreign Application Priority Data

Jun. 28, 2002   (AU) ...................... PS3305

(51) Int. Cl.
B64C 29/00 (2006.01)
B64C 27/52 (2006.01)
B64C 15/12 (2006.01)

(52) U.S. Cl. ............... 244/17.23; 244/17.25; 244/56

(58) Field of Classification Search ........ 244/7 C, 244/12.3, 12.4, 17.19, 17.23, 17.25, 23 B, 244/56

See application file for complete search history.

(56) References Cited

U.S. PATENT DOCUMENTS

| | | | |
|---|---|---|---|
| 1,491,310 A | 4/1924 | Perrin | |
| 2,138,999 A | 12/1938 | Clark | |
| 2,233,747 A | 3/1941 | Riedl | |
| D153,315 S | 4/1949 | Piasecki | |
| 2,629,568 A | 2/1953 | Croshere, Jr. et al. | |
| 2,969,935 A * | 1/1961 | Price | 244/7 C |
| 3,219,120 A | 11/1965 | Hooper | |
| 3,231,221 A | 1/1966 | Platt | |
| 3,278,138 A | 10/1966 | Haberkorn | |
| 3,282,534 A | 11/1966 | Serriades | |
| 3,298,633 A | 1/1967 | Dastoli et al. | |
| 3,311,327 A | 3/1967 | Greulich | |
| 3,360,217 A | 12/1967 | Trotter | |
| 3,404,852 A | 10/1968 | Sambell | |
| 3,405,890 A | 10/1968 | Eickman | |
| 3,514,051 A | 5/1970 | Celayan | |

(Continued)

FOREIGN PATENT DOCUMENTS

AU    200218828 A1    9/2002

(Continued)

*Primary Examiner*—Rob Swiatek

(57) ABSTRACT

Vertical take-off aircraft (1) has first (4) and second (17) lifting mechanism (eg helicopter-type rotors, jets, turboprops) arranged in tandem, either above or outboard of ends (2, 3). Lifting mechanisms (4, 17) are independently tiltable, in multiple directions, by hydraulic rams (11, 13, 14, 16, 24, 26, 27, 29) to manoeuvre aircraft (1). In particular first lifting mechanism (4) may be tilted in the opposite transverse direction to second lifting mechanism (17) so as to alter direction of flight. First lifting mechanism (4) may be tilted by further hydraulic rams so that its rotor lies in a vertical plane for forward flight of aircraft (1).

22 Claims, 16 Drawing Sheets

U.S. PATENT DOCUMENTS

| | | |
|---|---|---|
| 3,592,412 A | 7/1971 | Glatfelter |
| 3,797,783 A | 3/1974 | Kisovec |
| 3,905,565 A | 9/1975 | Kolwey |
| 3,985,320 A | 10/1976 | Brady |
| 4,032,084 A | 6/1977 | Black |
| 4,537,372 A | 8/1985 | Forizs |
| 4,982,914 A | 1/1991 | Eickmann |
| 5,085,315 A | 2/1992 | Sambell |
| 5,709,357 A | 1/1998 | von Wilmowsky |
| 5,868,351 A | 2/1999 | Stamps et al. |
| 6,019,578 A | 2/2000 | Hager et al. |
| 6,089,501 A | 7/2000 | Frost |
| 6,293,491 B1 | 9/2001 | Wobben |
| 6,340,133 B1 | 1/2002 | Capanna |
| 6,367,736 B1 | 4/2002 | Pancotti |
| 6,581,872 B2 | 6/2003 | Walmsley |
| 6,592,071 B2 | 7/2003 | Kinkead et al. |
| 7,150,429 B2 * | 12/2006 | Kusic ................ 244/17.23 |
| 2002/0100835 A1 | 8/2002 | Kusic |
| 2003/0094537 A1 | 5/2003 | Austen-Brown |
| 2003/0106959 A1 | 6/2003 | Fukuyama |

FOREIGN PATENT DOCUMENTS

| | | |
|---|---|---|
| CA | 2376126 A1 | 9/2002 |

* cited by examiner

TANDEM POWERED POWER TILTING AIRCRAFT

This invention relates to the vertical take-off field of aviation.

Many versions of helicopters using tandem rotors have been constructed to date. What has been common to all such helicopters is that the lifting rotors have had to have variable pitch blades to allow control of the helicopters.

This invention provides an aircraft that can fly in a similar manner to a conventional tandem rotor helicopter but does not require a blade pitch varying mechanism.

The aircraft has a main body that is longer than it is wider, a lifting mechanism at the front, which is the primary lifting mechanism, and another lifting mechanism at the rear, which is a secondary lifting mechanism. The primary lifting mechanism is joined to the forward part of the main body of the aircraft by a tilt enabling joint, and the secondary lifting mechanism is joined to the aft part of the main body of the aircraft by another tilt enabling joint.

The tilt enabling joints provide the means to position the lifting mechanisms above the main body of the aircraft and the means to tilt the primary and secondary lifting mechanisms in a plurality of directions and angles in a controlled manner relative to the main body of the aircraft. Referring to the tilt enabling joint that can tilt the primary lifting mechanism as a primary tilt enabling joint, the primary lifting mechanism can be tilted forward, rearward, and from side to side with respect to the main body of the aircraft by means of the primary tilt enabling joint. And referring to the tilt enabling joint that can tilt the secondary lifting mechanism as a secondary tilt enabling joint, the secondary lifting mechanism can be tilted forward, rearward, and from aide to side with respect to the main body of the aircraft by means of the secondary tilt enabling joint.

Tilting of the lifting mechanisms is used as a means to control the aircraft instead of varying blade pitches. By using tilting of lifting mechanisms to control the aircraft during flight, combinations of different forms of lifting mechanisms can be used. For example, the front lifting mechanism can be in the form of a rotor with fixed pitch blades and an engine assembly, with the blades able to force air in a downward direction, while the rear lifting mechanism can be a jet engine which can force exhaust gases directly downward or downward and sideways, depending on the tilting of the jet. By being able to tilt the jet forward and rearward, and from side to side, changes in exhaust direction can be achieved. Sideway directed exhaust can be used to counter the torque of the forward rotor during take off. Because the aircraft has a jet at the rear instead of a rotor, the downwash over the rear part of the body of the aircraft from rotor blades is avoided. As such wings can be fitted to the rear of the aircraft. On conventional helicopters wings have been proven to be useless due to downwash from rotor blades. With wings fitted to the current invention, the aircraft could gain substantial lift during high speed forward flight, reducing the need to rely on the jet at the rear for lift. By fitting the forward lifting rotor and engine to the main body of the aircraft with multiple tilt enabling joints, the forward lifting mechanism could be tilted 90 degrees forward during forward flight, thus overcoming the need for a counter torque mechanism during high speed forward flight. The jet can then be tilted into a horizontal position, adding to forward propulsion. The aircraft in effect can be transformed into a high speed forward flying aeroplane, using a massive sized rotor at the front acting as a propeller on an aeroplane and a jet at the rear for forward propulsion. The wings would provide lift, and ailerons on the wings could counter the torque from the main rotor during high speed forward flight.

With the primary lifting mechanism at the front of the aircraft comprising a rotor with a plurality of blades connected to the rotor, and the rotor being rotated by an engine assembly to force air to travel in a downward direction, the engine assembly can consist of a single engine or a plurality of engines.

Since the rotor blades don't have to be varied as in a conventional helicopter, a simple option could be to use a turboprop as the primary lifting mechanism, positioned on the primary tilt enabling joint such that during take-off air in forced in a downward direction by means of the blades that form part of the turboprop.

While the secondary lifting mechanism can in one form be a jet engine, it can in another form be a rotor with a plurality of blades connected to the rotor, with an engine assembly to rotate the rotor, and by rotation of the rotor force air in a downward direction by means of the blades as the blades travel around the rotor. The engine assembly can be a single engine or a plurality of engines. In another form the secondary lifting mechanism can be a turboprop.

Hence it becomes apparent that different types of lifting mechanisms can be combined on the aircraft.

In one form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, while the secondary lifting mechanism also comprises an engine assembly, a rotor, and blades connected to the rotor, with the engine assembly of the secondary lifting mechanism able to rotate the rotor of the secondary lifting mechanism and the blades of the secondary lifting mechanism connected to the rotor of the secondary lifting mechanism such that air can be forced to travel in a downward direction by means of the blades of the secondary lifting mechanism rotating around the rotor of the secondary lifting mechanism.

In another form of the aircraft the primary lifting mechanism is a turboprop which is positioned on the primary tilt enabling joint such that air can be forced in a downward direction by means of the blades of the turboprop, and the secondary lifting mechanism is a turboprop which is positioned on the secondary tilt enabling joint such that air can be forced in a downward direction by means of the blades of the turboprop.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism is a turboprop which is positioned on the secondary tilt enabling joint such that air can be forced in a downward direction by means of the blades of the turboprop.

In another form of the aircraft the primary lifting mechanism is a turboprop which is positioned on the primary tilt enabling joint such that air can be forced in a downward direction by means of the blades of the turboprop, while the secondary lifting mechanism comprises an engine assembly, a rotor, and blades connected to the rotor, with the engine assembly of the secondary lifting mechanism able to rotate the rotor of the secondary lifting mechanism and the blades of the secondary lifting mechanism connected to the rotor of the secondary lifting mechanism such that air can be forced to travel in a downward direction by means of the blades of the secondary lifting mechanism rotating around the rotor of the secondary lifting mechanism.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism is a jet engine in the form of a turbojet that can be tilted so that exhaust from the turbojet can be forced in a downward direction behind the main body of the aircraft.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism is a jet engine in the form of a turbofan that can be tilted so that exhaust from the turbofan can be forced in a downward direction behind the main body of the aircraft.

In another form of the aircraft the primary lifting mechanism is a turboprop which is positioned on the primary tilt enabling joint such that air can be forced in a downward direction by means of the blades of the turboprop, and the secondary lifting mechanism is a jet engine in the form of a turbojet that can be tilted so that exhaust from the turbojet can be forced in a downward direction behind the main body of the aircraft.

In another form of the aircraft the primary lifting mechanism is a turboprop which is positioned on the primary tilt enabling joint such that air can be forced in a downward direction by means of the blades of the turboprop, and the secondary lifting mechanism is a jet engine in the form of a turbofan that can be tilted no that exhaust from the turbofan can be forced in a downward direction behind the main body of the aircraft.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism comprises two jet engines that can be tilted so that exhaust from the jet engines can be forced in a downward direction behind the main body of the aircraft, with each jet engine being a turbojet.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism comprises two jet engines that can be tilted so that exhaust from the jet engines can be forced in a downward direction behind the main body of the aircraft, with each jet engine being a turbofan.

In another form of the aircraft the primary lifting mechanism is a turboprop which is positioned on the primary tilt enabling joint such that air can be forced in a downward direction by means of the blades of the turboprop, and the secondary lifting mechanism comprises two jet engines that can be tilted so that exhaust from the jet engines can be forced in a downward direction behind the main body of the aircraft, with each jet engine being a turbofan.

In another form of the aircraft the primary lifting mechanism is a turboprop which is positioned on the primary tilt enabling joint such that air can be forced in a downward direction by means of the blades of the turboprop, and the secondary lifting mechanism comprises two jet engines that can be tilted no that exhaust from the jet engines can be forced in a downward direction behind the main body of the aircraft, with each jet engine being a turbojet.

In one form of the aircraft where the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, the engine assembly consists of a single engine.

In another form of the aircraft where the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, the engine assembly consists of two engines.

In one form of the aircraft where the primary lifting mechanism comprises an engine assembly, a rotor, and blades connected to the rotor, and the engine assembly of the primary lifting mechanism consists of a single engine, a power transmission mechanism is connected to the engine of the primary lifting mechanism, by which power transmission mechanism the respective engine is able to rotate the rotor or the primary lifting mechanism.

In another form of the aircraft where the primary lifting mechanism comprises an engine assembly, a rotor, and blades connected to the rotor, and the engine assembly of the primary lifting mechanism consists of two engines, a power transmission mechanism is connected to the engines of the primary lifting mechanism, by which power transmission mechanism the engines of the primary lifting mechanism are able to rotate the rotor of the primary lifting mechanism.

In one form of the aircraft where the secondary lifting mechanism comprises an engine assembly, a rotor, and blades connected to the rotor of the secondary lifting mechanism, the engine assembly of the secondary lifting mechanism consists of a single engine.

In another form of the aircraft where the secondary lifting mechanism comprises an engine assembly, a rotor, and blades connected to the rotor of the secondary lifting mechanism, the engine assembly consists of two engines.

In one form of the aircraft where the secondary lifting mechanism comprises an engine assembly, a rotor, and blades connected to the rotor of the secondary lifting mechanism, and the engine assembly consists of a single engine, a power transmission mechanism is connected to the engine of the secondary lifting mechanism, by which power transmission mechanism the respective engine is able to rotate the rotor of the secondary lifting mechanism.

In another form of the aircraft where the secondary lifting mechanism comprises an engine assembly, a rotor, and blades connected to the rotor, and the engine assembly of the secondary lifting mechanism consists of two engines, a power transmission mechanism is connected to the engines of the secondary lifting mechanism by which power transmission mechanism the engines of the secondary lifting mechanism are able to rotate the rotor of the secondary lifting mechanism.

The tilt enabling joints can comprise various components. Some of the components are such that they hold the joint together while allowing the joint to have movement, forming a movement enabling assembly, while other components form an activating mechanism that can force movement between components of the movement enabling assembly.

In one form of the aircraft the movement enabling assembly of the primary tilt enabling joint is a universal joint and the activating mechanism comprises four hydraulic actuators connected to the movement enabling assembly.

In another form of the aircraft the movement enabling assembly of the primary tilt enabling joint comprises a hinge assembly and the activating mechanism comprises a hydraulic actuating mechanism connected to the movement enabling assembly.

In another form of the aircraft the movement enabling assembly of the primary tilt enabling joint comprises two hinges transversely connected and the activating mechanism comprises four hydraulic actuators connected to the movement enabling assembly.

In one form of the aircraft the movement enabling assembly of the secondary tilt enabling joint is a universal joint and the activating mechanism comprises four hydraulic actuators connected to the movement enabling assembly.

In another form of the aircraft the movement enabling assembly of the secondary tilt enabling joint comprises a hinge assembly and the activating mechanism comprises a hydraulic actuating mechanism connected to the movement enabling assembly.

In another form of the aircraft the movement enabling assembly of the secondary tilt enabling joint comprises two hinges transversely connected and the activating mechanism comprises four hydraulic actuators connected to the movement enabling assembly.

In one form of the aircraft the primary lifting mechanism is connected to the main body of the aircraft by the primary tilt enabling joint such that only part of the primary lifting mechanism can be positioned in front of the main body of the aircraft.

In another form of the aircraft the primary lifting mechanism is connected to the main body of the aircraft by the primary tilt enabling joint such that the whole of the primary lifting mechanism can be positioned in front of the main body of the aircraft.

In one form of the aircraft the primary lifting mechanism is connected to the main body of the aircraft by the primary tilt enabling joint such that only a part of the primary lifting mechanism can be positioned above the main body of the aircraft.

In another form of the aircraft the primary lifting mechanism is connected to the main body of the aircraft by the primary tilt enabling joint such that the whole of the primary lifting mechanism can be positioned above the main body of the aircraft.

In one form of the aircraft the secondary lifting mechanism is connected to the main body of the aircraft by the secondary tilt enabling joint such that only part of the secondary lifting mechanism can be positioned behind the main body of the aircraft.

In another form of the aircraft the secondary lifting mechanism is connected to the main body of the aircraft by the secondary tilt enabling joint such that the whole of the secondary lifting mechanism can be positioned behind the main body of the aircraft.

In one form of the aircraft the secondary lifting mechanism is connected to the main body of the aircraft by the secondary tilt enabling joint such that only part of the secondary lifting mechanism can be positioned above the main body of the aircraft.

In another form of the aircraft the secondary lifting mechanism is connected to the main body of the aircraft by the secondary tilt enabling joint such that the whole of the secondary lifting mechanism can be positioned above the main body of the aircraft.

In another form of the aircraft an additional tilt enabling joint is used to connect the primary tilt enabling joint to the main body of the aircraft to allow a greater amount of tilting movement between the primary lifting mechanism and the main body of the aircraft. The additional tilt enabling joint, which in a third tilt enabling joint, comprises a movement enabling assembly that is a hinge, and the activating mechanism comprises two hydraulic actuators connected to the movement enabling assembly and the main body of the aircraft.

In one form of the aircraft the secondary lifting mechanism is pivotally connected to the secondary tilt enabling joint such that the secondary lifting mechanism can be rotated on the secondary tilt enabling joint without the secondary tilt enabling joint having to move. In a form of the aircraft this rotating ability is achieved by means of a metal plate being used to join the secondary lifting mechanism to the upper section of the secondary tilt enabling joint, with the metal plate being joined to the upper section of the secondary tilt enabling joint by means of a large rivet, and an electric motor that turns a wheel is used to rotate the metal plate on the secondary tilt enabling joint, with the electric motor connected to the secondary tilt enabling joint and the wheel.

In another form of the aircraft the secondary tilt enabling joint is connected to the main body of the aircraft such that the secondary tilt enabling joint can be rotated on the aft end of the main body of the aircraft without components of the secondary tilt enabling joint having to move with respect to one another. In a form of the aircraft this rotating ability is achieved by means of a metal plate being used to join the lower section of the secondary tilt enabling joint to the upper part of the aft end of the main body of the aircraft, with the metal plate being joined to the upper part of the main body by means of a large rivet which protrudes from inside of the main body of the aircraft. An electric motor that turns a wheel is used to rotate the metal plate that the secondary tilt enabling joint in attached to, with the electric motor connected to the upper section of the main body of the aircraft.

DETAILED DESCRIPTION OF THE DRAWINGS

Figure 1:
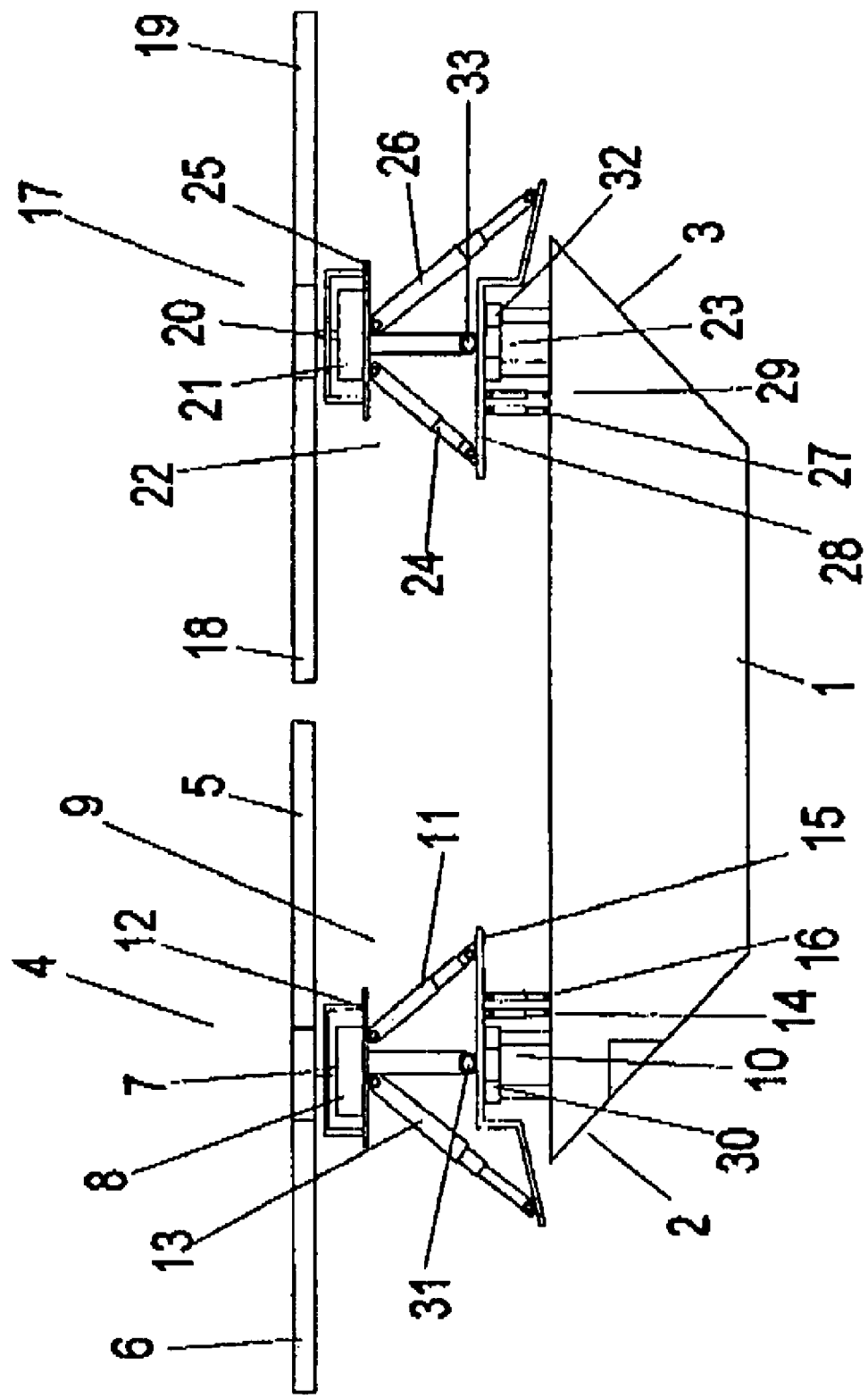
FIG. 1 shows one form of aircraft according to this invention, comprising a rotor at the front and a rotor at the rear of the main body, with each rotor being able to be tilted in forward, rearward and lateral directions. The aircraft is shown in vertical take-off mode.

FIG. 1 shows one form of the aircraft according to this invention. The aircraft has a main body 1 with a forward end 2 and an aft end 3. The primary lifting mechanism 4 comprises two blades 5, 6, connected to a rotor 7, which rotor 7 is rotated by means of an engine assembly 8 comprising one engine. The primary lifting mechanism 4 is connected to the top of the forward end 2 of the main body 1 by means of the primary tilt enabling joint 9 which has a movement enabling assembly in the form of a universal joint 10. A hydraulic actuator 11 is able to move the upper section 12 of the primary tilt enabling joint 9 forward and the hydraulic actuator 13 is able to move the upper section 12 of the primary tilt enabling joint in a rearward direction, while another hydraulic actuator 14 is connected to the main body 1 of the aircraft so that it is on the left side of the universal joint 10 and so that it is able to tilt a metal platform 15 which forms part of the universal joint 10 to the right side of the main body (Refer FIG. 2).

Another hydraulic actuator 16 is connected to the main body 1 or the aircraft so that it is on the right side of the universal joint and so that it can tilt the metal platform 15 to the left side of the main body of the aircraft. The hydraulic actuator 14 is positioned behind the universal joint 10 but is further forward on the main body than is the hydraulic actuator 16. The hydraulic actuators 14 and 16 are connected to the main body 1 and the metal platform 15 that forms part of the universal joint 10. The hydraulic actuators 11 and 13 are connected to the metal platform 15 and the upper section 12 of the primary tilt enabling joint 9. The secondary lifting mechanism 17 comprises blades 18, 19, connected to a rotor 20, which rotor 20 is rotated by means of an engine assembly 21 that comprises a single engine. The secondary lifting mechanism 17 is connected to the top of the aft end 3 of the main body 1 by means of the secondary tilt enabling joint 22 which has a movement enabling assembly in the form of a universal joint 23. A hydraulic actuator 24 is able to move the upper section 25 of the secondary tilt enabling joint 22 rearward with respect to the main body 1 and the hydraulic actuator 26 is able to move the upper section 25 of the secondary tilt enabling joint in a forward direction, while another hydraulic actuator 27 is connected to the main body 1 of the aircraft so that it is on the left side of the universal joint 23 and so that it is able to tilt a metal platform 28 which forms part of the universal joint 23 to the right side of the main body. Another hydraulic actuator 29 is connected to the main body 1 of the aircraft so that it is on the right side of the universal joint 23 so that it can tilt the metal platform 20 to the left side of the main body of the aircraft. The hydraulic actuator 27 is positioned further forward on the main body than is the hydraulic actuator 29. The hydraulic actuators 27 and 29 are connected to the main body 1 and the metal platform 28 that forms part of the universal joint 23. The hydraulic actuators 24 and 26 are connected to the metal platform 28 and the upper section 25 of the secondary tilt enabling joint 22. The universal joint 10 of the primary tilt enabling joint 9 is formed by transversely connecting hinges 30 and 31 by means of the metal platform 15. The universal joint 23 of the secondary tilt enabling joint 22 is formed by transversely connecting hinges 32 and 33 by means of the metal platform 28. The hinges 30 and 32 are joined to the upper part of main body 1 of the aircraft. By forcing air in a downward direction by means of the primary lifting mechanism and the secondary lifting mechanism the aircraft is able to achieve vertical takeoff. By tilting the primary lifting mechanism forward by means of the primary tilt enabling joint and tilting the secondary lifting mechanism forward by means of the secondary tilt enabling joint the aircraft is able to achieve forward flight as air is force downward and to the rear of the aircraft by the primary lifting mechanism and secondary lifting mechanism. The primary lifting mechanism and the secondary lifting mechanism are arranged in tandem order above the main body 1, with the primary lifting mechanism forward of the secondary lifting mechanism. The primary tilt enabling joint and the secondary tilt enabling joint are also in tandem order on top of the main body 1, with the primary tilt enabling joint in front of the secondary tilt enabling joint. The blades of the primary lifting mechanism protrude in front of the forward end of the main body 1.

Figure 2:
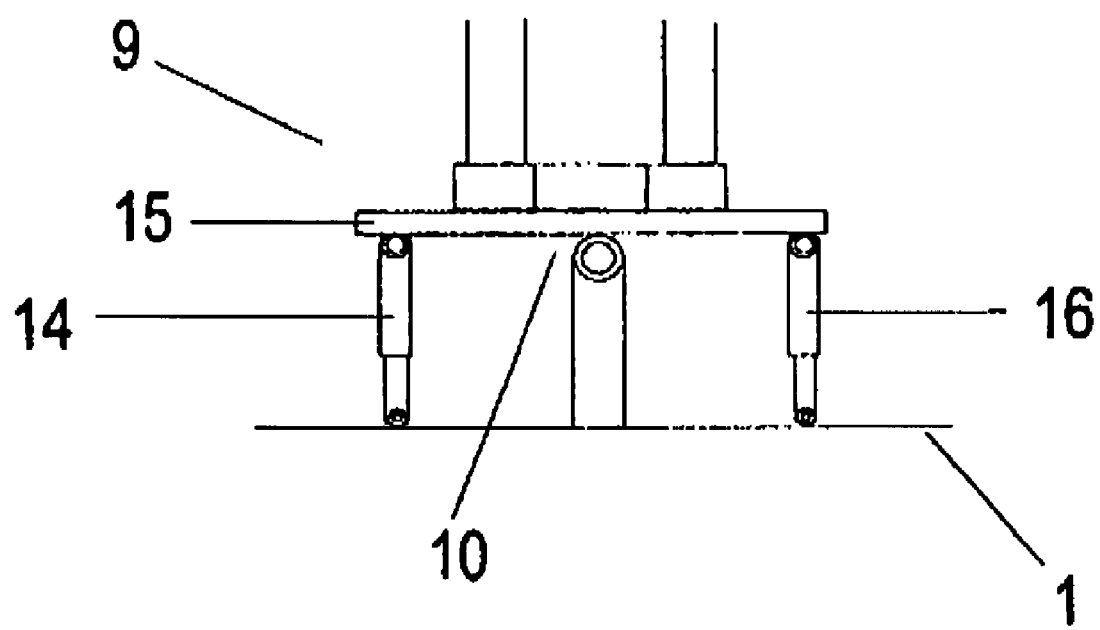
FIG. 2 shows an enlarged view of the lower part of the tilt enabling joint that connects the forward rotor to the main body, as viewed from behind.

FIG. 2 shows the lower part of the primary tilt enabling joint 9 at the forward end of the main body 1 of the aircraft of FIG. 1. The view is from behind and shows the universal joint 10 as it would appear from behind, and the positioning of hydraulic actuators 14 and 16, with hydraulic actuator 14 to the left of the universal joint 10 and hydraulic actuator 16 to the right of the universal joint 10. The hydraulic actuators are connected to the metal plate 15 that forms part of the universal joint.

The hydraulic actuators 27 and 29 of the secondary tilt enabling joint 22 of FIG. 1 are distanced in the same manner from the universal joint 23 as the hydraulic actuators 14 and 16 are distanced from the universal joint 10 of the primary tilt enabling joint.

Figure 3:
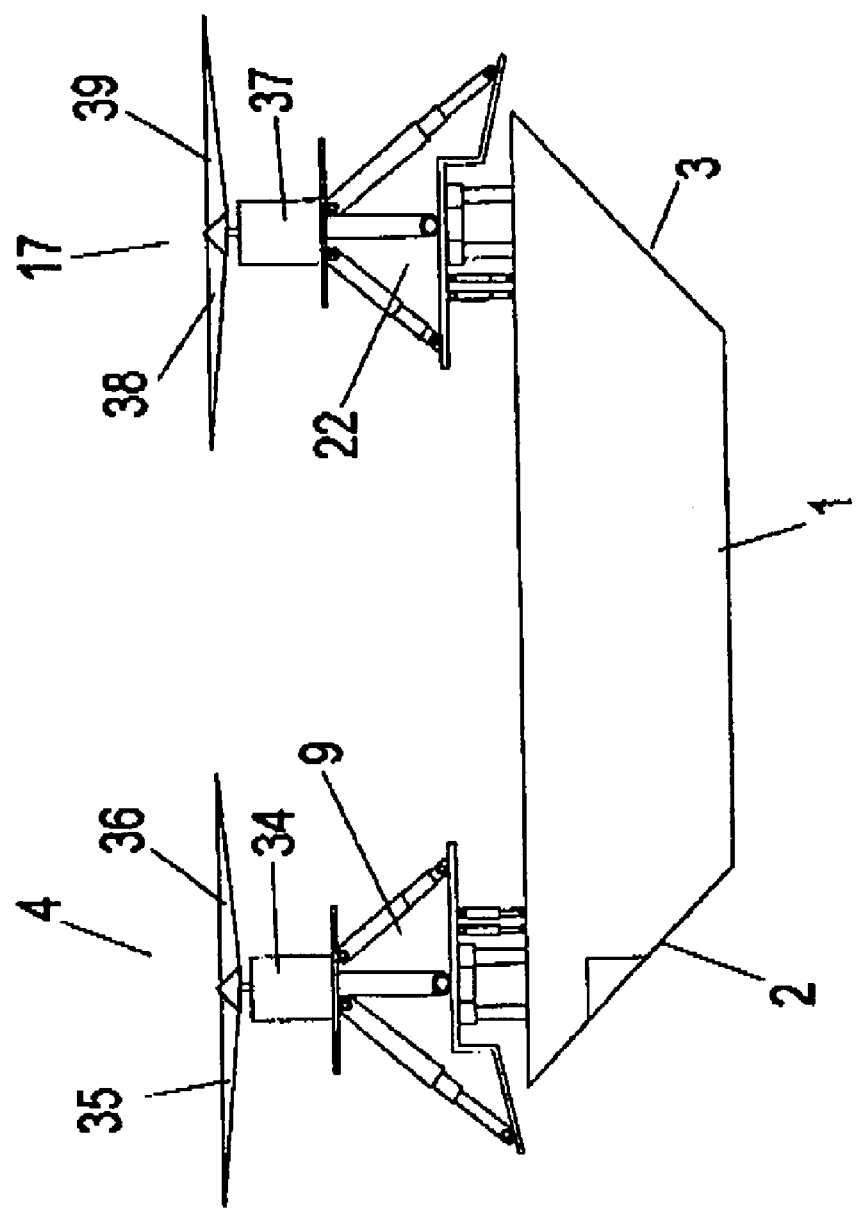
FIG. 3 shows another form of the aircraft, with the forward lifting mechanism comprising a turboprop and the rear lifting mechanism also comprising a turboprop.

FIG. 3 shows another form of the aircraft. The aircraft has a main body 1 as in FIG. 1, with a forward end 2 and an aft end 3. The primary tilt enabling joint 9 is the same as in FIG. 1 and the secondary tilt enabling joint 22 is the same as in FIG. 1. The primary lifting mechanism 4 is a turboprop 34 which can force air in a downward direction by means of the blades 35 and 36. The secondary lifting mechanism 17 is another turboprop 37 which can force air in a downward direction by means of the blades 30 and 39.

Figure 4:
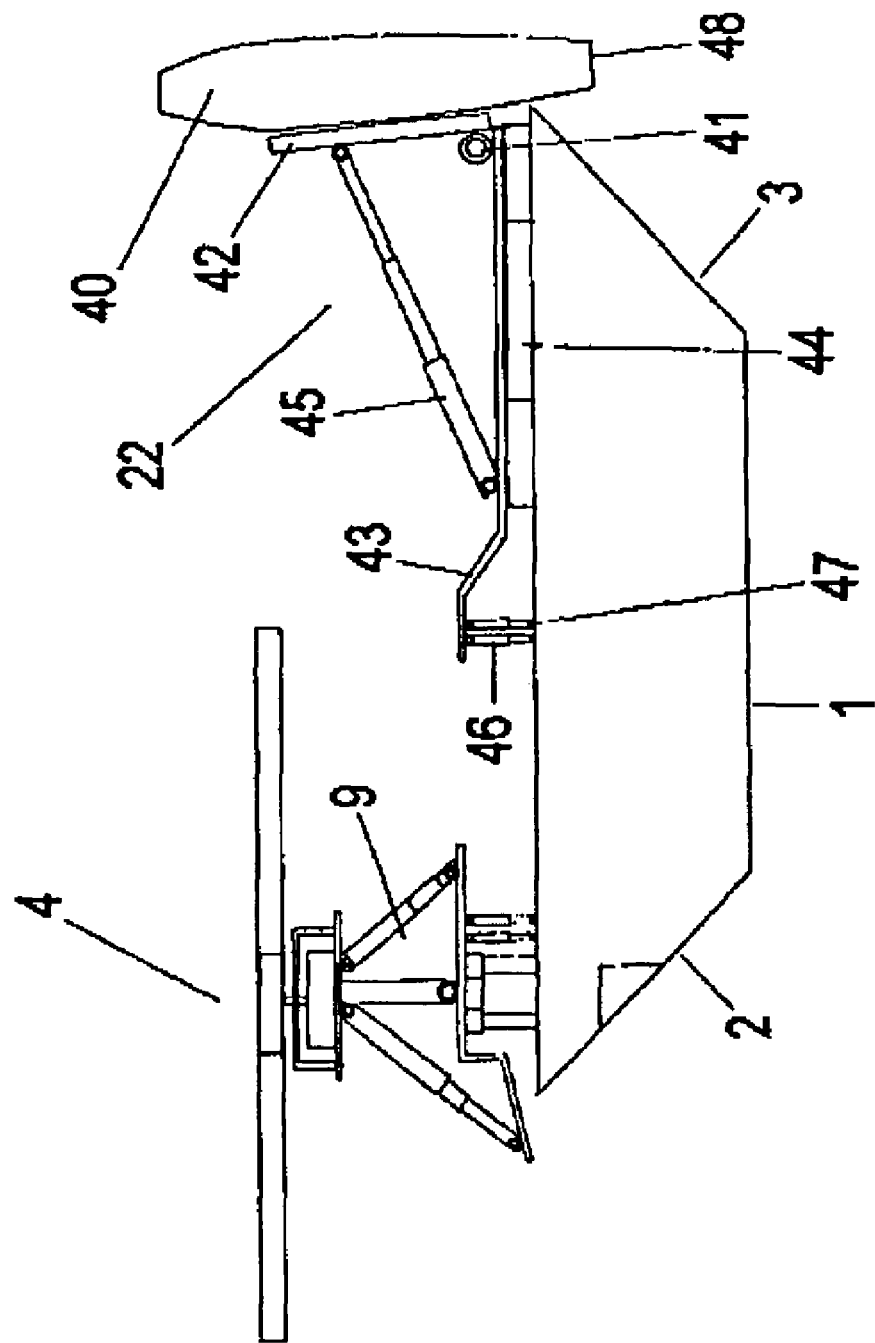
FIG. 4 shows another form of the aircraft, with the forward lifting mechanism comprising a rotor as shown in FIG. 1, and the rear lifting mechanism comprising a jet which is able to be tilted in forward, rearward and lateral directions.

FIG. 4 shows another form of the aircraft. The aircraft has a main body 1 with a forward end 2 and rear end 3. The primary lifting mechanism 4 is the same as in FIG. 1 and the primary tilt enabling joint 9 is the same as in FIG. 1. The secondary lifting mechanism 40 is a jet engine. The jet engine 40 is a turbojet and is attached to a hinge 41. The turbojet 40 is joined to metal plate 42 that forms of the hinge 41. A lower metal plate 43 forms part of the hinge 41. The lower metal plate 43 in connected to another hinge 44 that is positioned longitudinally on top of the main body 1. The lower hinge 44 is joined to the upper part of the main body 1 of the aircraft. The hinges 41 and 44 are transversely connected. A hydraulic actuator 45 is connected to the metal plates 42 and 43 of hinge 41 such that it is able to tilt the turbojet 40 in a rearward direction by pushing the metal plate 42 in a rearward direction. A hydraulic actuator 46 is connected to the lower metal plate 43 and the upper part of the main body and is connected to the main body 1 of the aircraft so that it is on the left of the lower hinge 44 such that it can tilt the lower plate 43 to the right. Another hydraulic actuator 47 is connected to the upper part of the main body and the lower metal plate 43, and is connected to the main body 1 of the aircraft so that it to on the right side of the lower hinge 44 such that it can tilt the lower plate 43 to the left side of the main body 1. The metal plates 42, 43, the hinges 41 and 44, and the hydraulic actuators 45, 46, and 47 form the secondary tilt enabling joint 22. The jet engine 40 is shown to be partly behind the main body 1 of the aircraft angled such that it forces exhaust gases in a downward direction through the rear 48 of the turbojet 40. A turbofan jet engine could be used in place of the turbojet 40 positioned in the same manner as the turbojet 40.

Figure 5:
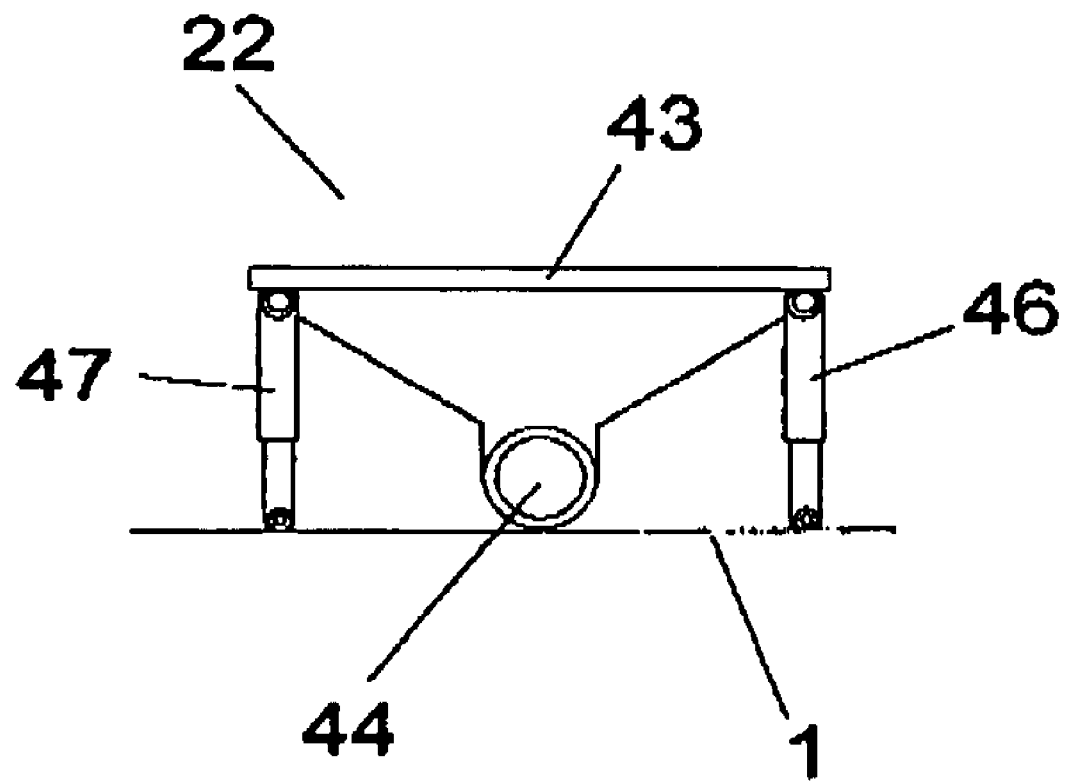
FIG. 5 shows the front of the lower part of the tilt enabling joint that joins the rear lifting mechanism to the main body of the aircraft.

FIG. 5 shows the front of lower part of the secondary tilt enabling joint 22 of FIG. 4 as viewed from in front of the secondary tilt enabling joint 22. FIG. 5 shows the lower hinge 44 connected to the lower plate 43 of FIG. 4 and the main body 1 of the aircraft, and the distancing of the hydraulic actuators 46 and 47 from the lower hinge 44.

Figure 6:
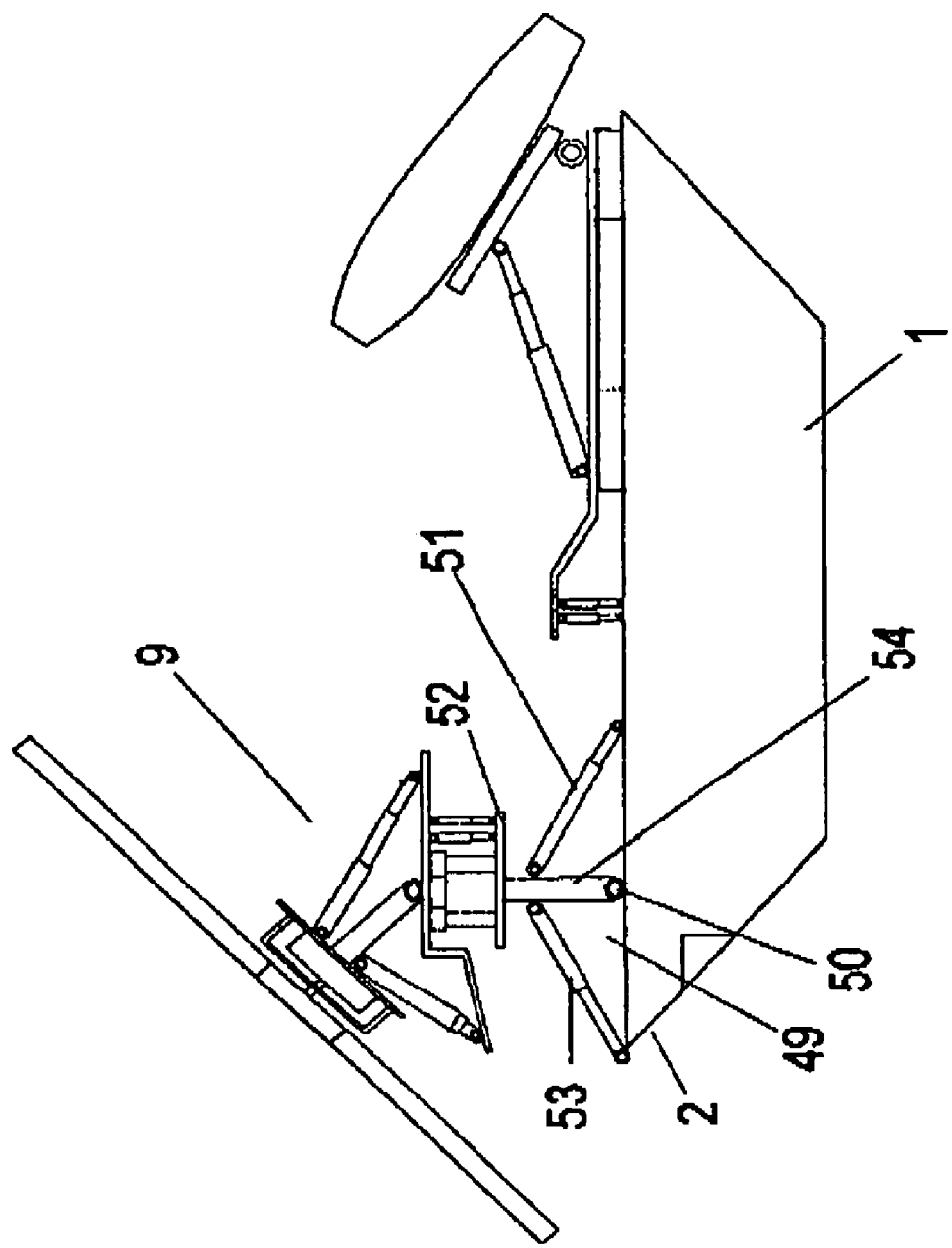
FIG. 6 shows the aircraft of FIG. 4 now fitted with an additional forward tilt enabling joint.

FIG. 6 shows the aircraft of FIG. 4 fitted with an additional tilt enabling joint 49, which is a third tilt enabling joint. Referring to the additional tilt enabling joint as a third tilt enabling joint, the third tilt enabling joint 49 is in the form of a hinge 50 which is connected to the upper part of the forward end 2 of the main body 1 of the aircraft. A hydraulic actuator 51 that forms part of the third tilt enabling joint is able to tilt the upper section 52 of the third tilt enabling joint in a forward direction. The primary tilt enabling joint 9 is connected to the upper section 52 of the third tilt enabling joint and is shown in a state of forward tilt. Hydraulic actuator 53 forms part of the third tilt enabling joint and is able to tilt the upper section 52 of the third tilt enabling joint in a rearward direction. The hydraulic actuator 51 is connected to the upper part of the main body of the aircraft and to a stem 54 which protrudes from the hinge 50.

The hydraulic actuator 53 is connected to the stem 54 and the upper part of the forward end 2 of the main body of the aircraft.

Figure 7:
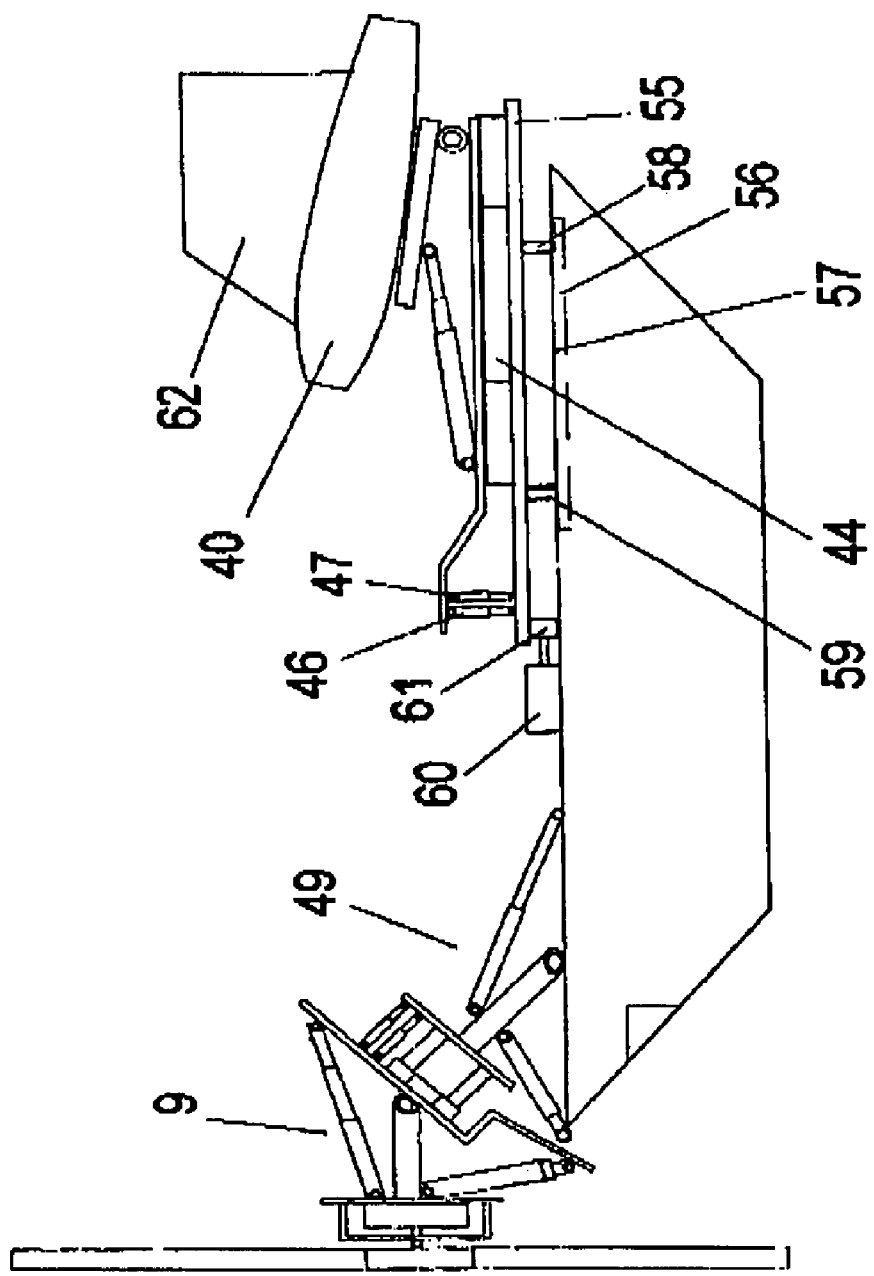
FIG. 7 shows the aircraft of FIG. 6 with the aircraft now comprising a means to rotate the tilt enabling joint at the rear relative to the main body of the aircraft.

FIG. 7 shows a modified form of the aircraft of FIG. 6, with the third tilt enabling joint 49 in a forward tilt, the primary tilt enabling joint 9 in a forward tilt, and the jet engine 40 in a forward tilt, FIG. 7 shows that the whole of the primary lifting mechanism is in front of the main body of the aircraft. In FIG. 7 the aircraft is different to the aircraft in FIG. 6 in that it has the lower hinge 44 connected to a metal plate 55. The metal plate 55 is connected to a large rivet 56 which is contained within the main body and protrudes from the main body 1 through an opening 57 in the upper part of the main body. The metal plate 55 is supported on metal blocks 58 and 59 such that the metal plate 55 can be rotated by an electric motor 60 rotating a wheel 61. Hydraulic actuators 46 and 47 are connected to the metal plate 55 and are in the same position with respect to the hinge 44 as they are in the aircraft of FIG. 4. FIG. 7 also shows a fin 62 attached to the jet engine 40. The jet is shown further behind the on the aft end of the main body of the aircraft then in FIG. 6. The jet engine 40 could now be tilted in rearward direction so that it could be placed behind the main body of the aircraft.

Figure 8:
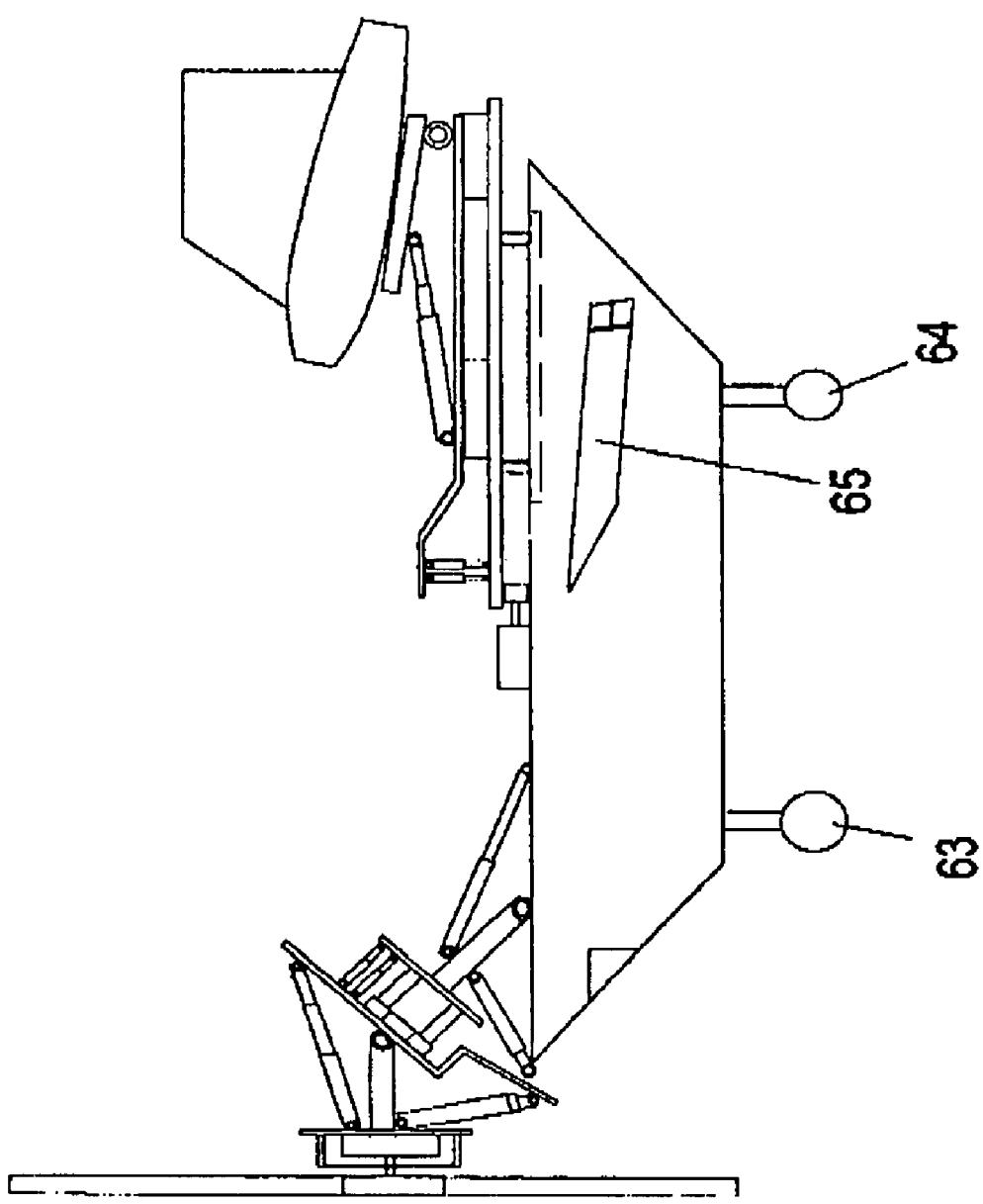
FIG. 8 shows the aircraft of FIG. 7 with wheels fitted to the main body, and a wing on the left side of the main body of the aircraft.

FIG. 8 shows the aircraft of FIG. 7, now fitted with wheel assemblies 63 and 64. Wings can be fitted to the main body of the aircraft. FIG. 6 shows the position of a wing 65 on the left side of the main body of the aircraft.

Figure 9:
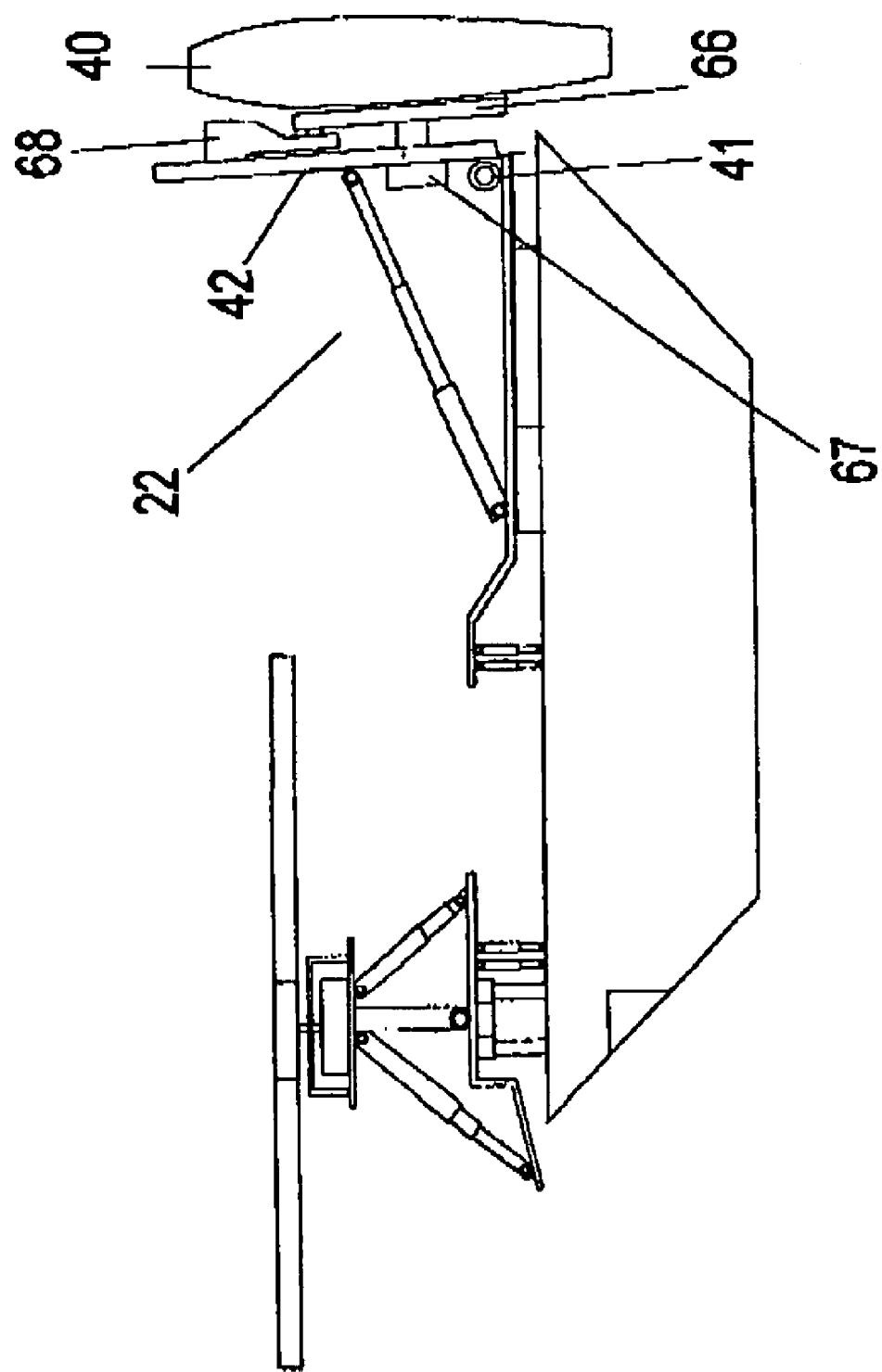
FIG. 9 shows the aircraft of FIG. 4 now comprising a means to rotate the jet at the rear relative to the tilt enabling joint at the rear.

FIG. 9 shows a variation of the aircraft of FIG. 4. The upper metal plate 42 of the hinge 41 is longer, the jet engine 40 is attached to another metal plate 66, and a large rivet 67 now joins the metal plate 66 to the metal plate 42, which rivet connects the metal plates 42 and 66 such that the metal plate 66 can pivotally rotate with respect to the metal plate 42.

A hydraulically activated rotating arm 68 is used to rotate the metal plate 66 with respect to the metal plate 42. The rivet 67 and the hydraulically activated rotating arm 68 combined with the additional metal plate 66 hence form a rotation enabling mechanism by which the jet engine 40 can be pivotally rotated with respect to the secondary tilt enabling joint 22.

FIGS. 1, 3, 4 and 9 show that the aircraft can take-off and land vertically. FIG. 8 shows that the aircraft can also take-off and land as a conventional forward flying aeroplane when fitted with wheels, wings, and when the tilt enabling joints have tilted the primary lifting mechanism and the secondary lifting mechanism forward. The aircraft could take-off while moving forward as an areoplane and land as a helicopter, and vice versa.

Figure 10:
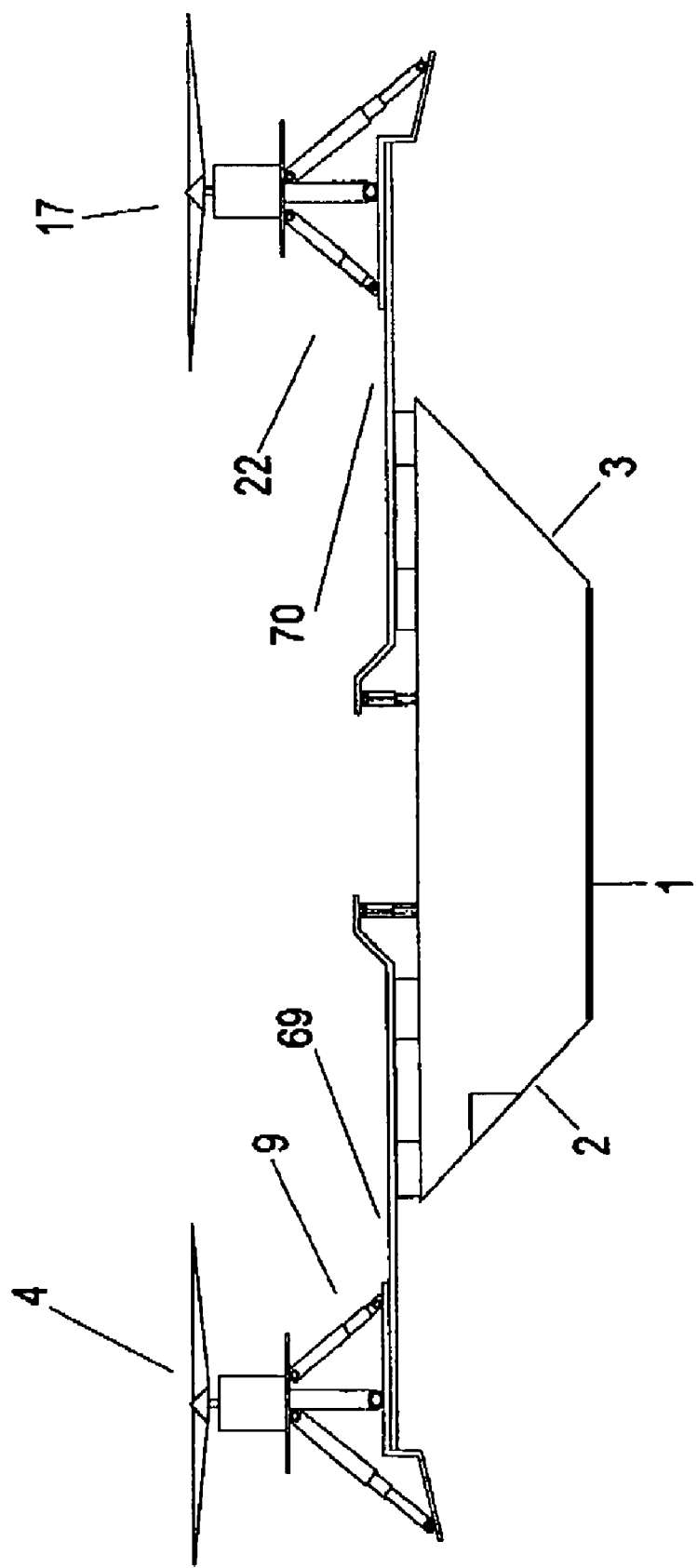
FIG. 10 shows how the forward lifting mechanism can be placed in front of the main body of the aircraft, and how the lifting mechanism at the rear can be placed behind the main body of the aircraft.

FIG. 10 shows another form of the aircraft, with the whole of the primary lifting mechanism 4 now in front of and above the forward end 2 of the main body 1. The secondary lifting mechanism 17 is now completely above and behind the aft end 3 of the main body 1. The primary tilt enabling joint 9 and the secondary tilt enabling joint 22 are combinations of components of tilt enabling joints shown in previous figures. An addition is the extension platform 69 shown in respect of the primary tilt enabling joint 9 and the extension platform 70 of the secondary tilt enabling joint 22.

Figure 11:
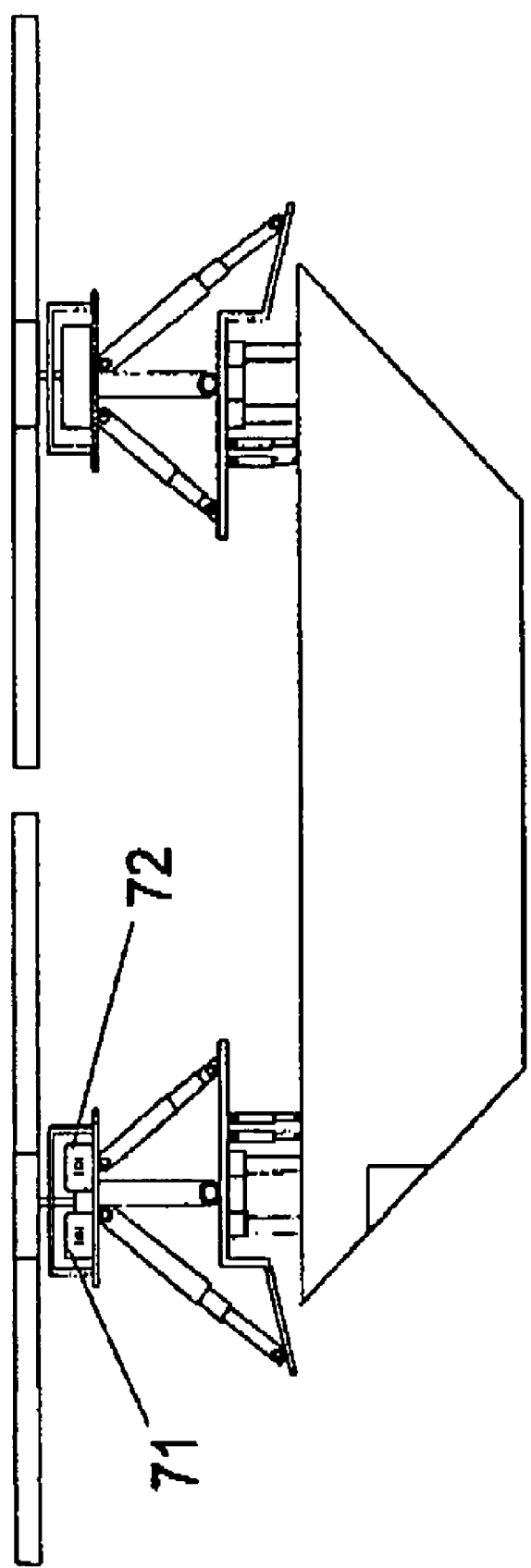
FIG. 11 shows the aircraft of FIG. 1 with the engine assembly of the forward lifting mechanism now comprising two engines.

FIG. 11 shows the aircraft of FIG. 1 with the engine assembly of the forward lifting mechanism now comprising two engines 71 and 72. In FIG. 1 the engine assembly of the forward lifting mechanism comprised a single engine.

Figure 12:
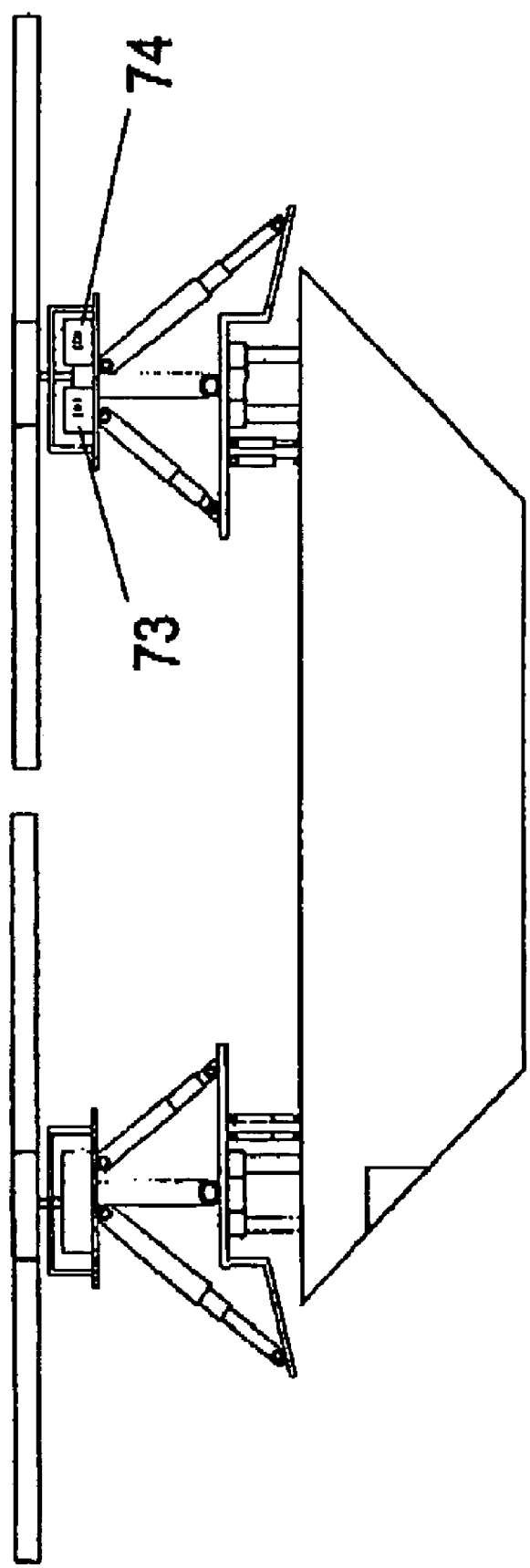
FIG. 12 shows the aircraft of FIG. 1 with the engine assembly of the rear lifting mechanism now comprising two engines.

FIG. 12 shows the aircraft of FIG. 1 with the engine assembly of the rear lifting mechanism now comprising two engines 73 and 74. In FIG. 1 the engine assembly of the rear lifting mechanism comprised a single engine.

Figure 13:
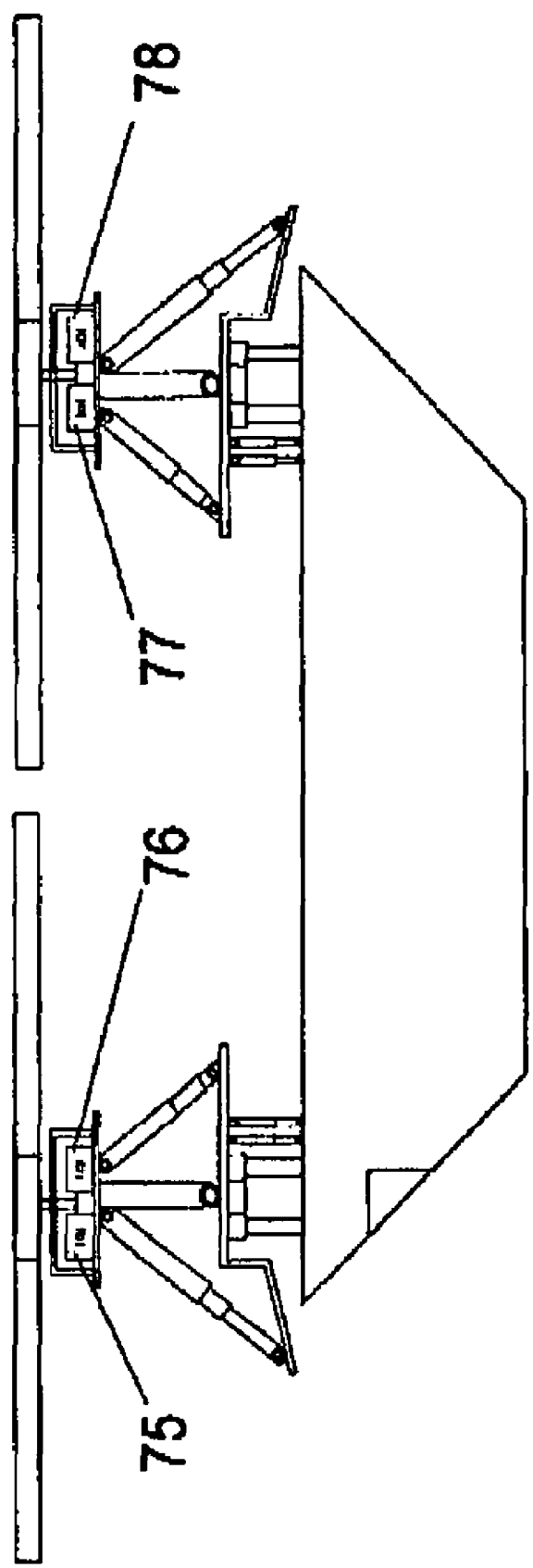
FIG. 13 shows the aircraft of FIG. 1 with the engine assembly of the rear lifting mechanism now comprising two engines and the engine assembly of forward lifting mechanism also comprising two engines.

FIG. 13 shows the aircraft of FIG. 1 with the engine assembly of the forward lifting mechanism now comprising two engines 75, 76, and the engine assembly of the rear lifting mechanism also comprising two engines 77 and 78.

Figure 14:
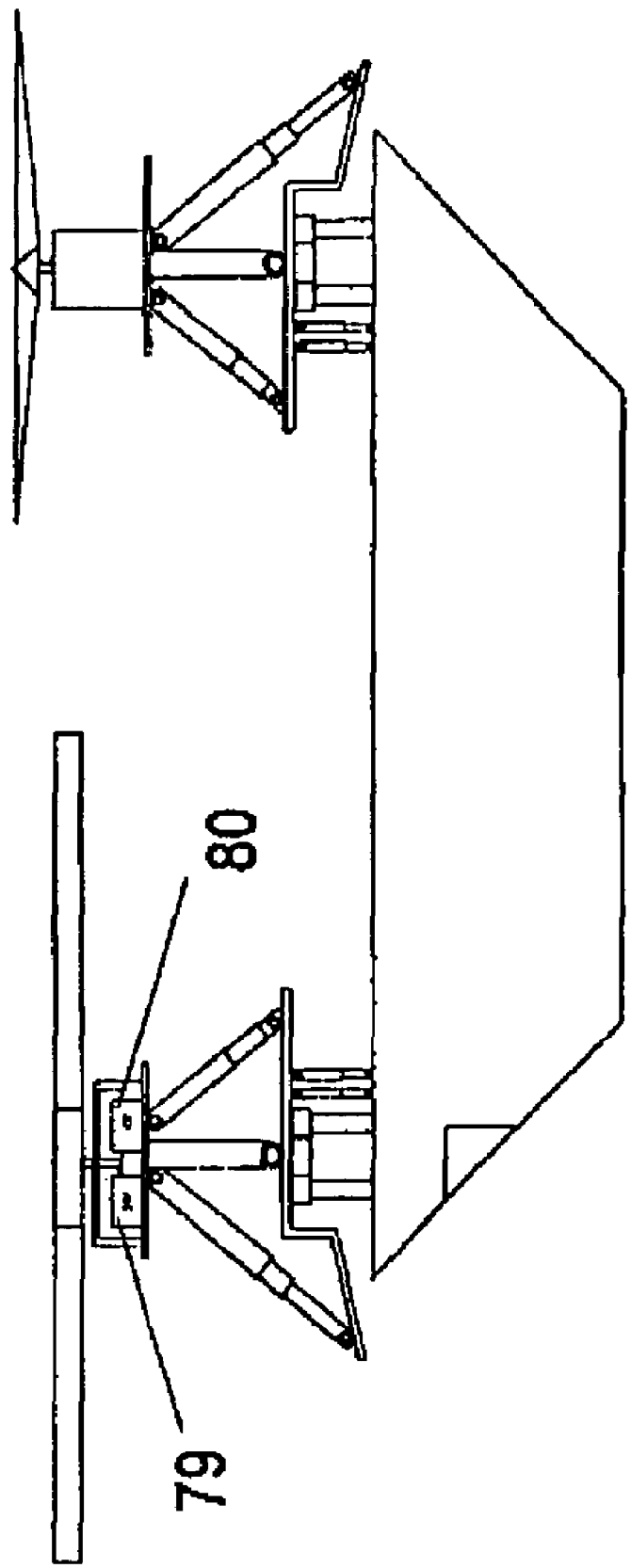
FIG. 14 shows a form of aircraft according to this invention with the engine assembly of the forward lifting mechanism of the aircraft of FIG. 1 comprising two engines, and the lifting mechanism at the rear comprising a turbo-prop.

FIG. 14 shows a variation of the aircraft of FIG. 1 with the engine assembly of the forward lifting mechanism of the aircraft of FIG. 1 now comprising two engines 79, 80, and the lifting mechanism at the rear now comprising a turboprop as was shown in FIG. 3.

Figure 15:
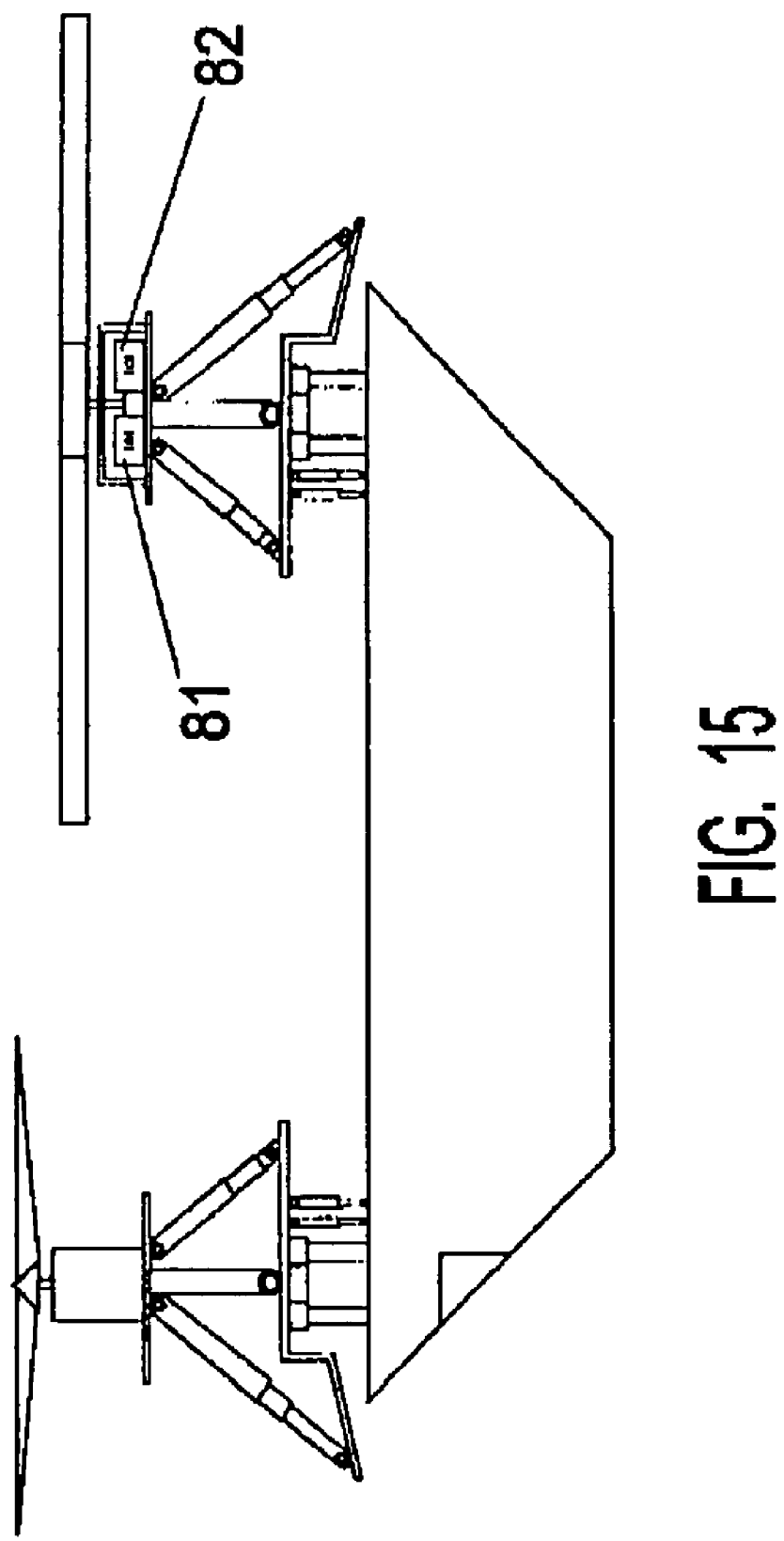
FIG. 15 shown a form of aircraft according to this invention with the engine assembly of the rear lifting mechanism of the aircraft of FIG. 1 comprising two engine, and the lifting mechanism at the front comprising a turbo-prop.

FIG. 15 shows a variation of the aircraft of FIG. 1 with the engine assembly of the rear lifting mechanism of the aircraft of FIG. 1 now comprising two engines, 81, 82, and the lifting mechanism at the front comprising a turboprop as was shown in FIG. 3.

Figure 16:
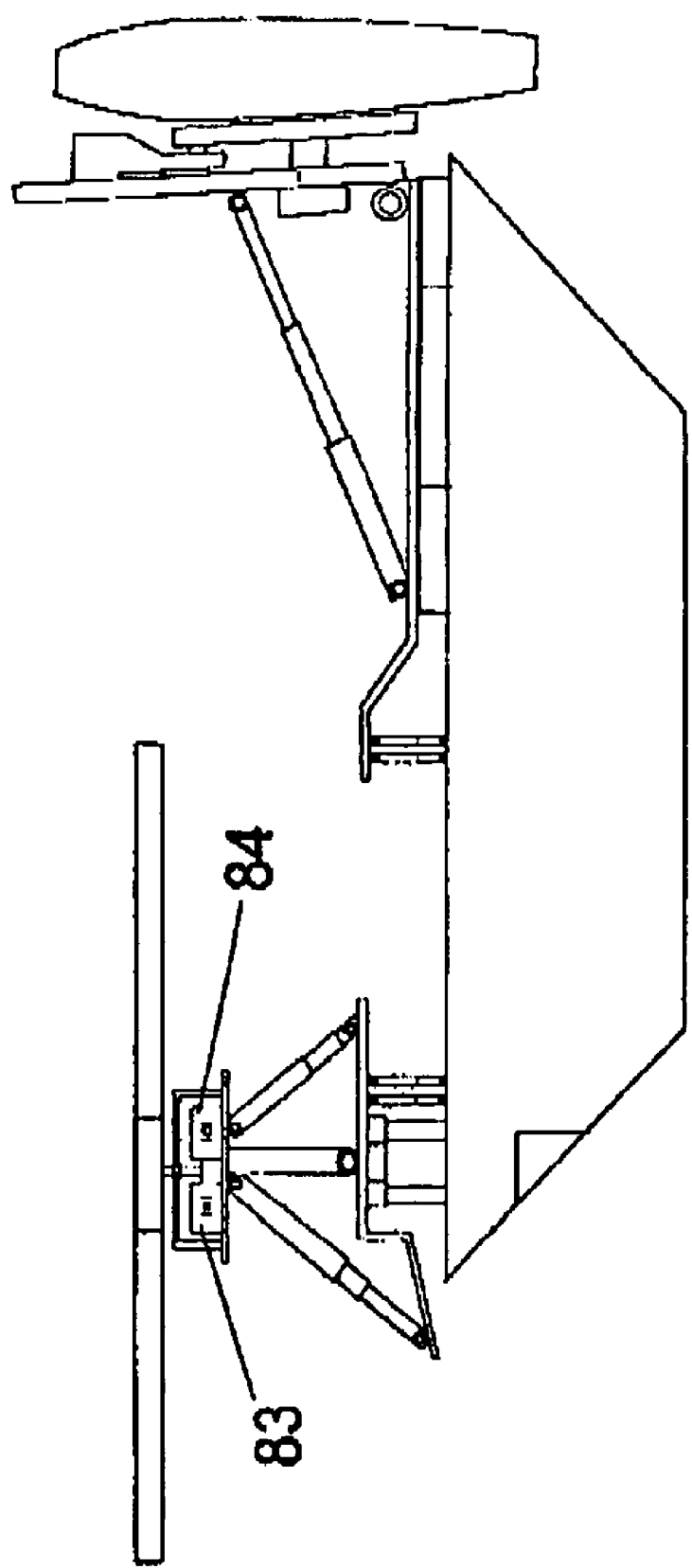
FIG. 16 shows a form of aircraft according to this invention with the engine assembly of the forward lifting mechanism of the aircraft of FIG. 1 comprising two engines, and the lifting mechanism at the rear comprising a jet engine.

FIG. 16 shows a variation of the aircraft of FIG. 1 with the engine assembly of the forward lifting mechanism of the aircraft of FIG. 1 now comprising two engine as 83, 84, and the lifting mechanism at the rear comprising a jet engine as was shown in FIG. 9.

What I claim as my invention is:

1. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism comprises a power plant as a means for providing downwardly extending thrust to the aircraft, and which secondary lifting mechanism comprises a power plant as a means for providing downwardly extending thrust to the aircraft, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism extending thrust in a downward direction and an upward force exerted on the main body of the aircraft by the secondary lifting mechanism extending thrust in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

2. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism comprises a rotor, an engine assembly, and a plurality of blades, with the said blades connected to the rotor, and which said engine assembly is able to rotate the said rotor, with the blades connected to the rotor such that when the rotor is rotated by the said engine assembly air can be forced in a downward direction by means of the blades rotating around the rotor, with the primary lifting mechanism able to exert an upward force on the forward end of the main body of the aircraft by forcing air in a downward direction by way of the blades rotating around the rotor, and the secondary lifting mechanism comprises a rotor, an engine assembly, and a plurality of blades, with the blades of the secondary lifting mechanism connected to the rotor of the secondary lifting mechanism, and which engine assembly of the secondary lifting mechanism is able to rotate the rotor of the secondary lifting mechanism, with the blades of the secondary lifting mechanism connected to the rotor of the secondary lifting mechanism such that when the rotor of the secondary lifting mechanism is rotated by the engine assembly of the secondary lifting mechanism air can be forced in a downward direction by means of the blades of the secondary lifting mechanism rotating around the rotor of the secondary lifting mechanism, with the secondary lifting mechanism able to exert an upward force on the aft end of the main body of the aircraft by forcing air in a downward direction by way of the blades of the secondary lifting mechanism rotating around the rotor of the secondary lifting mechanism, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism forcing air in a downward direction and an upward force exerted on the main body of the aircraft by the secondary lifting mechanism forcing air in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

3. The aircraft of claim 2 wherein the engine assembly of the primary lifting mechanism comprises a single engine and the engine assembly of the secondary lifting mechanism comprises a single engine.

4. The aircraft of claim 2 wherein the engine assembly of the primary lifting mechanism comprises a plurality of engines and the engine assembly of the secondary lifting mechanism comprises a single engine.

5. The aircraft of claim 2 wherein the engine assembly of the primary lifting mechanism comprises a single engine and the engine assembly of the secondary lifting mechanism comprises a plurality of engines.

6. The aircraft of claim 2 wherein the engine assembly of the primary lifting mechanism comprises a plurality of engines and the engine assembly of the secondary lifting mechanism comprises a plurality of engines.

7. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, which primary lifting mechanism is a turboprop, and which primary lifting mechanism is attached to the primary tilt enabling joint such that air can be forced in a downward direction by the primary lifting mechanism, and such that by forcing air in a downward direction the primary lifting mechanism is able to exert an upward force on the forward end of the main body of the aircraft, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and the secondary lifting mechanism is a turboprop, which secondary lifting mechanism is attached to the secondary tilt enabling joint such that air can be forced in a downward direction by the secondary lifting mechanism, and such that by forcing air in a downward direction the secondary lifting mechanism is able to exert an upward force on the aft end of the main body of the aircraft, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism forcing air in a downward direction and an upward force exerted on the main body of the aircraft by the secondary lifting mechanism forcing air in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

8. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism comprises a rotor, an engine assembly, and a plurality of blades, with the said blades connected to the rotor, and which said engine assembly is able to rotate the said rotor, with the blades connected to the rotor such that when the rotor is rotated by the said engine assembly air can be forced in a downward direction by means of the blades rotating around the rotor, with the primary lifting mechanism able to exert an upward force on the forward end of the main body of the aircraft by forcing air in a downward direction by way of the blades rotating around the rotor, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and the secondary lifting mechanism comprises at least one jet engine, which said at least one jet engine is attached to the secondary tilt enabling joint such that the said at least one jet engine is able to force exhaust gases to travel in a downward direction and such that by forcing exhaust gases to travel in a downward direction the said at least one jet engine can exert an upward force on the aft end of the main body, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism forcing air in a downward direction and an upward force exerted on the main body of the aircraft by the secondary lifting mechanism forcing exhaust gases to travel in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

9. The aircraft of claim 8 wherein the said at least one jet engine is a turbojet.

10. The aircraft of claim 8 wherein the said at least one jet engine is a turbofan.

11. The aircraft of claim 8 wherein the engine assembly of the primary lifting mechanism comprises a single engine.

12. The aircraft of claim 8 wherein the engine assembly of the primary lifting mechanism comprises a plurality of engines.

13. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism through the primary tilt enabling joint and an upward force exerted on the main body of the aircraft by the secondary lifting mechanism through the secondary tilt enabling joint while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

14. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, which primary lifting mechanism is a turboprop, and which primary lifting mechanism is attached to the primary tilt enabling joint such that air can be forced in a downward direction by the primary lifting mechanism, and such that by forcing air in a downward direction the primary lifting mechanism is able to exert an upward force on the forward end of the main body of the aircraft, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and the secondary lifting mechanism comprises at least one jet engine, which said at least one jet engine is attached to the secondary tilt enabling joint such that the said at least one jet engine is able to force exhaust gases to travel in a downward direction and such that by forcing exhaust gases to travel in a downward direction the said at least one jet engine can exert an upward force on the aft end of the main body, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism forcing air in a downward direction and an upward force exerted on the main body of the aircraft by the secondary lifting mechanism forcing exhaust gases to travel in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

15. The aircraft of claim 14 wherein the said at least one jet engine is a turbojet.

16. The aircraft of claim 14 wherein the said at least one jet engine is a turbofan.

17. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism comprises a rotor, an engine assembly, and a plurality of blades, with the said blades connected to the rotor, and which said engine assembly is able to rotate the said rotor, with the blades connected to the rotor such that when the rotor is rotated by the said engine assembly air can be forced in a downward direction by means of the blades rotating around the rotor, with the primary lifting mechanism able to exert an upward force on the forward end of the main body of the aircraft by forcing air in a downward direction by way of the blades rotating around the rotor, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and the secondary lifting mechanism is a turboprop, which secondary lifting mechanism is attached to the secondary tilt enabling joint such that air can be forced in a downward direction by the secondary lifting mechanism, and such that by forcing air in a downward direction the secondary lifting mechanism is able to exert an upward force on the aft end of the main body of the aircraft, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism forcing air in a downward direction and an upward force exerted on the main body of the aircraft by the secondary lifting mechanism forcing air in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

18. The aircraft of claim 17 wherein the engine assembly of the primary lifting mechanism comprises a single engine.

19. The aircraft of claim 17 wherein the engine assembly of the primary lifting mechanism comprises a plurality of engines.

20. An aircraft with a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, and which said tilt enabling joint is a primary tilt enabling joint, which primary lifting mechanism is a turboprop, and which primary lifting mechanism is attached to the primary tilt enabling joint such that air can be forced in a downward direction by the primary lifting mechanism, and such that by forcing air in a downward direction the primary lifting mechanism is able to exert an upward force on the forward end of the main body of the aircraft, with the primary lifting mechanism able to exert an upward force on the forward end of the main body of the aircraft through the primary tilt enabling joint, and which secondary lifting mechanism is connected to the main body of the aircraft by an additional tilt enabling joint, which said additional tilt enabling joint is a secondary tilt enabling joint, and which said secondary lifting mechanism is connected to the main body of the aircraft by the secondary tilt enabling joint such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and which secondary lifting mechanism comprises a rotor, an engine assembly, and a plurality of blades, with the blades of the secondary lifting mechanism connected to the rotor of the secondary lifting mechanism, and which engine assembly of the secondary lifting mechanism is able to rotate the rotor of the secondary lifting mechanism, with the blades of the secondary lifting mechanism connected to the rotor of the secondary lifting mechanism such that when the rotor of the secondary lifting mechanism is rotated by the engine assembly of the secondary lifting mechanism air can be forced in a downward direction by means of the blades of the secondary lifting mechanism rotating around the rotor of the secondary lifting mechanism, with the secondary lifting mechanism able to exert an upward force on the aft end of the main body of the aircraft by forcing air in a downward direction by way of the blades of the secondary lifting mechanism rotating around the rotor of the secondary lifting mechanism, and which secondary lifting mechanism is able to exert an upward force on the aft end of the main body of the aircraft through the secondary tilt enabling joint, with the primary tilt enabling joint and the secondary tilt enabling joint connected to the main body of the aircraft, and with the aircraft able to achieve flight by means of an upward force exerted on the main body of the aircraft by the primary lifting mechanism forcing air in a downward direction and an upward force exerted on the main body of the aircraft by the secondary lifting mechanism forcing air in a downward direction while the primary lifting mechanism and the secondary lifting mechanism are maintained in tandem order, and with controlled lateral tilting of the primary lifting mechanism and the secondary lifting mechanism able to occur during flight while the primary lifting mechanism and the secondary lifting mechanism are maintained in tandem order.

21. The aircraft of claim 20 wherein the engine assembly of the secondary lifting mechanism comprises a single engine.

22. The aircraft of claim 20 wherein the engine assembly of the secondary lifting mechanism comprises a plurality of engines.

* * * * *